United States Patent [19]
White

[11] 3,951,025
[45] Apr. 20, 1976

[54] OVERLOAD SAFETY DEVICE
[75] Inventor: Neil S. White, Rochester, N.Y.
[73] Assignee: Eastman Kodak Company, Rochester, N.Y.
[22] Filed: Sept. 17, 1974
[21] Appl. No.: 506,924

[52] U.S. Cl. ................................ 83/543; 83/627; 83/639; 91/398
[51] Int. Cl.² ........................................... B26D 7/22
[58] Field of Search ............... 91/220, 398; 83/543, 83/627, 639

[56] References Cited
UNITED STATES PATENTS

| | | | |
|---|---|---|---|
| 1,499,569 | 7/1924 | Bailly | 91/220 |
| 2,033,181 | 3/1936 | Case | 83/543 |
| 2,438,951 | 4/1948 | Stephens | 83/543 |
| 2,783,838 | 3/1957 | Ericson et al. | 83/639 |
| 3,178,983 | 4/1965 | Brunson | 83/543 |
| 3,190,141 | 6/1965 | Schatter et al. | 83/543 |

Primary Examiner—Paul E. Maslousky
Attorney, Agent, or Firm—S. W. Gremban

[57] ABSTRACT

An overload safety device having a housing reciprocally movable through forward and reverse strokes of a set length. The housing has a cylinder and a piston mounted for reciprocal movement in the cylinder between a normal extended position and a retracted position. Fluid pressure is directed against one side of the piston for releasably holding the piston in its normal extended position. The piston has a rod to which a tool is attached at one end for performing an operation on a work piece upon reciprocal movement of the housing. If the tool should strike an obstruction, a slight displacement of the piston relative to the housing away from its normal extended position discontinues the fluid pressure directed against one side of the piston and directs it against the opposite side of the piston for rapidly moving the piston to its retracted position. The overload safety device may further be operated as a double acting cylinder.

10 Claims, 2 Drawing Figures

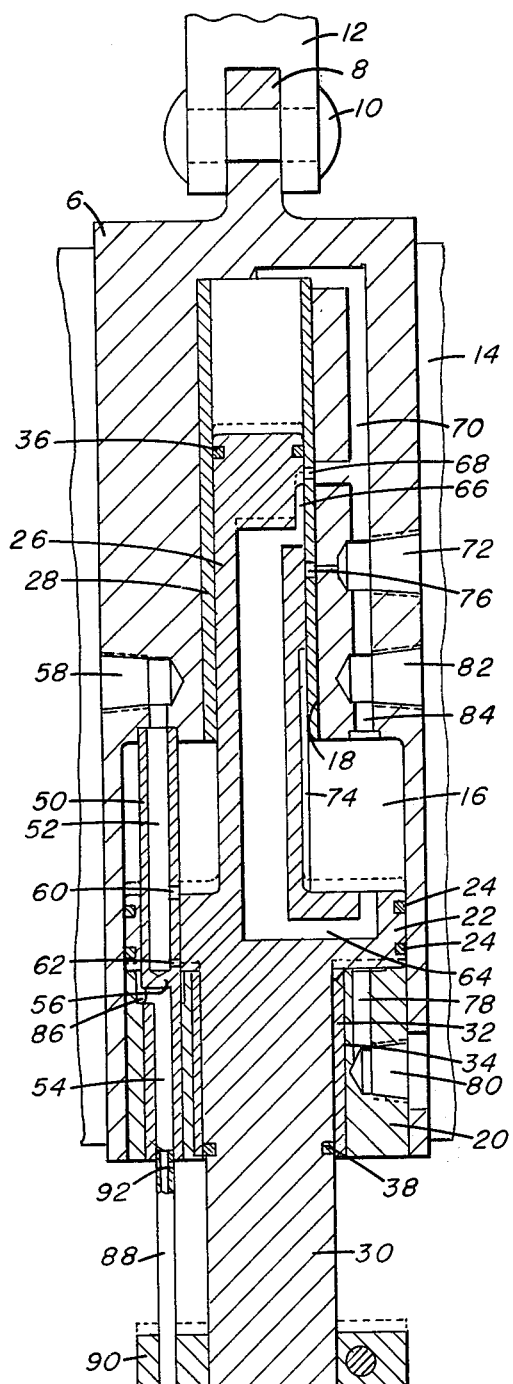
FIG. 1
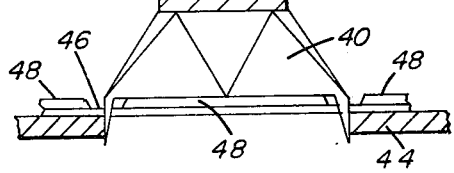
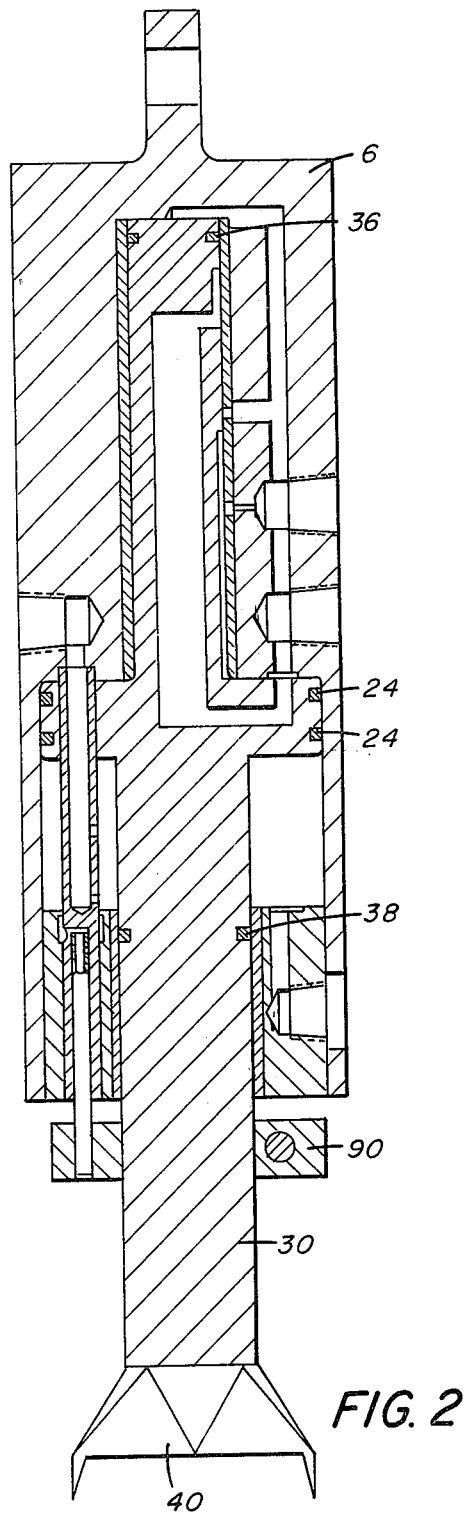
FIG. 2
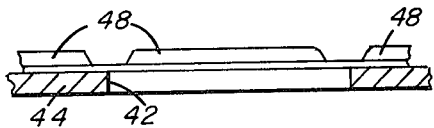

OVERLOAD SAFETY DEVICE

BACKGROUND OF THE INVENTION

1. Field of the Invention

This invention relates generally to cylinders, and more specifically to an overload safety device.

2. Description of the Prior Art

It is generally well known in the art to provide overload safety devices to prevent damage to interacting machine parts or tools. In such devices illustrated in U.S. Pat. Nos. 3,178,983 and 3,190,141, when the force generated between a tool and work piece exceeds a predetermined force a part of the device gives way providing a fluid escape chamber for the fluid permitting relative movement between the plunger and cylinder. One of the disadvantages of such overload safety devices is that the preloading pressure significantly must be exceeded before the overload device operates, and hence it is possible that some damage may result before the fluid release takes place. Another disadvantage of this overload safety device is that the plunger, due to fluid pressure, gravity and other forces occurring during high speed, reciprocating motion of the plunger, will strike an obstruction with great force before the release takes place causing damage to the tool or parts. Also, in U.S. Pat. No. 2,033,181, a. rotary shear is disclosed in which the shear elements yield and recede from each other in the case of undue load or resistance. In this prior art mechanism, when the oil pressure exceeds a predetermined force, a valve releases relieving the pressure on a piston which in turn automatically opens another valve permitting the oil to bypass the power cylinder and prevent any further increase in pressure. A disadvantage of this overload device is that the valves are relatively slow acting, and if used in a high speed reciprocating power device permit several strokes of the device to occur before the pressure is sufficiently released, thereby resulting in damage to the parts. In U.S. Pat. No. 2,783,838, another form of safety device for use in power presses is disclosed utilizing an electronic control means to terminate the downward movement of the platen in response to the reduction of electrical resistance between conductive members. A disadvantage of this safety device is that the electrical components are not always reliable, and such a safety device further reacts too slowly since electrical solenoids are involved for actuating the fluid control valves.

SUMMARY OF THE INVENTION

In accordance with a preferred embodiment of the invention, an overload safety device is disclosed for use in applications of the type in which a machine component is repetitively moved through a finite stroke, and is preferably provided with a tool attached thereto for operating on a work product supported on a bed. Exemplary applications are punch presses. The overload safety device comprises a housing which is reciprocally movable through finite forward and reverse strokes. The housing has a cylinder within which a piston is mounted for reciprocal movement relative to the housing between a normal extended position and a retracted position. The housing further has fluid supply passage means which is adapted when the piston is in its normal extended position for supplying fluid under pressure to the upper side of the piston for releasably holding the piston in the extended position. Accordingly, during normal operation, the housing and cylinder reciprocate as a unit with the piston in its extended position. In the event the piston engages an obstruction which causes the housing to be moved an incremental distance relative to the piston, the fluid supply passage means discontinues directing fluid under pressure to the upper side of the piston, and directs the fluid under pressure to the lower side of the piston for moving the piston to its retracted position. Accordingly, during continued repetitive movement of the housing, any tool attached to the piston would not engage the work product, and hence no damage to the tool or product would result.

More specifically, when the piston is in its extended postion, the lower side of the piston is in engagement with the lower end of the cylinder. The fluid supply passage means comprises a tube extending through the cylinder, piston and part of the housing. The tube has spaced ports extending through the wall of the tube for connecting the passage means to the cylinder. One port is contiguous to the upper side of the piston in its extended position, and supplies fluid under pressure to the upper side of the piston for releasably holding the piston in its extended position. The other port is adjacent the lower end of the cylinder and is closed by the piston in its extended position. Incremental movement between the housing and piston caused by the piston engaging an obstruction or the like, causes the piston to substantially simultaneously close the first port and open the second port which supplies fluid under pressure to the lower side of the piston for moving the piston from its extended position to its retracted position. The piston further has a fluid exhaust passage means for exhausting the fluid from the cylinder during movement of the piston from its extended to its retracted position. The overload safety device further has a fluid venting means comprising a vent passageway fluidly connecting the cylinder to the interior of the tube part, and valve means for allowing the fluid to bleed out of the tube part only when the piston is in its extended position.

It is accordingly, one of the objects and advantages of the present invention to provide an overload safety device that automatically retracts a piston when the piston exerts a force against an object that exceeds a predetermined force.

Another object and advantage of the invention is to provide an overload safety device that responds quickly to a force exerted thereon in excess of a predetermined force to automatically and positively retract the piston from the object.

Another object and advantage of the invention is to provide an overload safety device capable of functioning as a double-acting cylinder.

Another object and advantage of the invention is to provide an overload safety device that is of simple design and construction, thoroughly reliable and efficient in operation, and economical to manufacture.

Another object and advantage of the invention is to provide an overload safety device that does not require the use of sensing devices, and the pressurized fluid for driving the piston is directed to ports adjacent the piston resulting in a highly sensitive, fast-acting device.

Another object and advantage of the invention is to provide an overload safety device that is highly dependable since no interface of sensing devices and valves are required.

The invention and its objects and advantages will become more apparent from the detailed description of the preferred embodiment presented below.

BRIEF DESCRIPTION OF THE DRAWING

In the detailed description of the preferred embodiment of the invention presented below, reference is made to the accompanying drawing, in which:

FIG. 1 is a side elevational view in section of a preferred embodiment of the overload safety device of this invention with the device at one end of its stroke and the piston in its normal extended position; and FIG. 2 is a view similar to FIG. 1 with the device in the same position but with the piston moved to its retracted position.

DESCRIPTION OF THE PREFERRED EMBODIMENT

Because fluid cylinders are well known, the present description will be directed to elements forming part of, or cooperating more directly with, apparatus in accordance with the present invention. Cylinder elements not specifically shown or described should be understood to be selectable from those known in the art.

With reference to FIGS. 1 and 2, an overload safety device is disclosed comprising a housing 6 having a flange 8 which is drivingly connected by a pin 10 to an eccentric crank 12 of any suitable drive means, not shown, for imparting reciprocal movement to housing 6. The housing is constrained for lineal movement by guides 14, and upon operation of the drive means, housing 6 is reciprocally moved through forward and reverse strokes of a finite length. The stroke can be adjusted by adjusting the drive means such as by varying the crank arm of the eccentric in a manner known in the art. The housing 6 has a cylinder 16 having an upper bore 18 connected to the upper end of cylinder 16. An annular collar 20 is secured to the lower end of housing 6 with the upper end thereof forming the lower end of cylinder 16. A piston 22 is mounted within cylinder 16 for reciprocal movement, and is provided with rings 24 of any suitable type for sealing piston 22 to the inner surface of cylinder 16 and preventing the leakage of fluid past the piston. The piston 22 further has an upper rod 26 extending into a sleeve bearing 28 mounted in upper bore, 18, and a lower drive rod 30 extending through a sleeve bearing 32 mounted in opening 34 in collar 20. The rods 26, 30 are also provided with any suitable rings 36, 38 respectively for fluidly sealing the rods to the inner surfaces of sleeve bearings 28, 32. A tool 40 such as a die or the like is secured by any suitable means to the free end of drive rod 30, and cooperates with a die opening 42 in a die plate 44 for severing an object from a web 46 or the like. The web or the like may be of any suitable type, but in this application is illustrated as having a plurality of spaced apart articles 48 which are successively brought into register with die 40 and die opening 42 and punched out of web 46 upon intermittent transport of the web.

The piston 22 is in its normal extended position as illustrated in FIG. 1 with the lower surface of the piston in engagement with the lower end of cylinder 16. A fluid supply passage means is provided for directing fluid to cylinder 16 for releasably holding piston 22 in its normal extended position. The fluid supply passage means comprises an internal valve stem or tube 50 extending through cylinder 16, piston 22 and collar 20, and having one end secured to housing 6 and the other end secured to collar 20. The interior of tube 50 is divided into two passages 52, 54 by a baffle 56, and one end of tube 50 is connected by a port 58 in housing 6 to any suitable source of fluid pressure such as air, and the other end of tube 50 is exposed to atmosphere. With piston 22 in its normal extended position as illustrated in FIG. 1, the fluid under pressure is directed through port 58, tube passage 52 and a small port 60 extending through the wall of tube 50 into the portion of cylinder 16 between the upper side of piston 22 and the upper end of cylinder 16. The pressurized fluid exerts pressure on the upper side of piston 22 for releasably holding it in its extended position. In the event die 48 should strike an obstruction upon downward movement of housing 6, the die 48 and piston 22 is stopped by the obstruction, but housing 6 continues to move downwardly. As soon as the housing 6 has moved an incremental distance relative to piston 22 as designated by dotted lines in FIG. 1, piston 22 covers port 60 discontinuing the application of fluid pressure to the upper surface of the piston. Substantially simultaneously, a port 62 extending through tube wall 50 adjacent the lower end of cylinder 16 is partially uncovered by piston 22 resulting in the application of fluid under pressure to the lower side of piston 22 for moving the piston to its retracted position as illustrated in FIG. 2. During such upward movement of piston 22, the fluid in cylinder 16 above piston 22 is exhausted to atmosphere through a fluid exhaust passage means. The fluid exhaust passage means comprises a passageway 64 in piston 22 and rod 26 having one end terminating at the upper side of piston 22 and fluidly connected to cylinder 16. The other end of passageway 64 terminates in a peripheral slot 66 in rod 26 which in the extended position of piston 22 is closed off. However, in the displaced position of piston 22, slot 66 registers with an exhaust port 68 extending through sleeve 28. Port 68 is fluidly connected to an exhaust passageway 70 in housing 6 which exhausts to atmosphere through a port 72. As port 68 is closed off by the end of slot 66 of rod 26 upon further upward movement of piston 22, a peripheral slot 74 in rod 26 becomes aligned with a port 76 extending through sleeve 28 and fluidly connected to exhaust passageway 70 for exhausting the fluid from cylinder 16 to atmosphere during the remainder of the upward stroke of piston 22. By controlling the sizes of ports 68, 76 the speed of upward travel of piston 22 can be controlled.

After the obstruction is removed, piston 22 is reset to its normal position as illustrated in FIG. 1 by closing port 72, connecting port 58 to atmosphere and/or opening a fluid passageway 78 and port 80 in collar 20 to atmosphere. A port 82 in housing 6 which is normally connected to exhaust passageway 70 is connected to a source of fluid pressure. The fluid passes through port 82 and a passageway 84 into cylinder 16 and moves piston 22 from its retracted position to its extended position. During such movement, the fluid in the lower part of cylinder 16 is exhausted through ports 58, 80. When piston 22 reaches its normal extended position, ports 80, 82 are closed, port 72 is connected to exhaust and port 58 is connected to a source of fluid pressure.

When piston 22 is in its normal extended position and fluid is supplied to cylinder 16 under pressure for releasably holding piston 22 in its normal extended position, some fluid may bleed past rings 24 and between tube 50 and piston 22 to the lower side of piston 22 which could be detrimental. To overcome this problem, a vent bleeding means is provided comprising a port 86 fluidly connecting the lower end of cylinder 6 to tube passage 54 and an external valve stem 88 slidably insertable into tube passage 54 of tube 50. The valve stem 88 is secured to a clamp 90 which is clamped to rod 30. The valve stem 88 has a port 92 at the other end thereof which in the extended position of piston 22 fluidly connects port 86 and tube passage 54 to atmosphere. On movement of piston 22 from its extended position to its retracted position, stem 88 enters tube passage 54 and closes it off.

By closing ports 58, 72 piston 22 can be operated as a double-acting piston. Substantially simultaneously connecting port 80 to a source of fluid pressure and port 82 to exhaust moves piston 22 from its extended to its retracted position. Then switching the ports by substantially simultaneously connecting port 82 to a source of fluid pressure and port 80 to exhaust returns piston 22 from its retracted position to its extended position.

The invention has been described in detail with particular reference to a preferred embodiment, but it will be understood that variations and modifications can be effected within the spirit and scope of the invention as described.

I claim:

1. In an overload safety device for a reciprocally movable tool operating on a work-piece, the combination comprising:
   a housing reciprocally movable between initial and final positions for reciprocally moving a tool into and out of engagement with a work-piece, said housing having a cylinder;
   a piston coupled to the tool, said piston being mounted within said cylinder for movement relative to said housing between a normal extended position in which the tool operates on a work-piece upon reciprocal movement of said housing and piston as a unit, and a retracted position in which the tool is retracted from the work piece and does not operate thereon upon reciprocal movement of said housing and piston as a unit; and
   fluid supply passage means defined by said housing for supplying fluid under pressure to one side of said piston when said piston is in said normal extended position for releasably holding said piston in said extended position for reciprocal movement with said housing as a unit for operating the tool on the work-piece, and to discontinue supplying fluid under pressure to said one side of said piston and to supply fluid under pressure to the opposite side of said piston when the tool engages an obstruction between the work-piece and the tool causing incremental movement of said piston relative to said housing and away from said normal extended position for moving said piston to said retracted position for reciprocal movement with the housing as a unit with the tool retracted from and not operating on the work-piece.

2. The invention according to claim 1 wherein said opposite side of said piston in said extended position engages a stop surface, and said fluid supply passage means comprises a fluid supply passageway in said housing, a first port connecting said fluid supply passageway to said cylinder when said piston is in said extended position, and a second port adjacent said stop surface for connecting said fluid supply passageway to said cylinder when said piston is moved away from said extended position.

3. The invention according to claim 2 wherein said first port is arranged with one surface thereof substantially in the plane of said one side of said piston when said piston is in said extended position.

4. The invention according to claim 2 wherein said device further has fluid exhaust passage means for exhausting fluid from said cylinder when said piston is moved from said extended position to said retracted position.

5. The invention according to claim 4 wherein said fluid exhaust passage means comprises a first exhaust passageway in said piston, a second exhaust passageway in said housing, said first exhaust passageway having one end fluidly connected to said cylinder and its other end fluidly connectable to said second exhaust passageway during movement of said piston toward its retracted position.

6. The invention according to claim 5 wherein said fluid exhaust passage means further comprises a third exhaust passageway on said piston and a fourth exhaust passageway in said housing, said third exhaust passageway having one end fluidly connected to said cylinder and its other end fluidly connectable to said fourth exhaust passageway, said first exhaust passageway being fluidly connected to said second exhaust passageway during a first portion of the movement of said piston from said extended position toward said retracted position, and said third exhaust passageway being fluidly connected to said fourth exhaust passageway during the last portion of the movement of said piston to its retracted position.

7. The invention according to claim 2 wherein said fluid supply passageway comprises a tube extending through said cylinder and said piston, and said first and second ports are perforations extending through the wall of said tube.

8. The invention according to claim 2 wherein said fluid supply passageway comprises a tube extending through said cylinder, said piston and a part of said housing, said tube having a baffle for dividing said tube into two passages with one of said passages connected to a source of fluid pressure and the other of said passages open to atmosphere, said device further having fluid venting means defined by said part of said housing and said tube for allowing fluid that bleeds past said piston to escape through said other of said passages to atmosphere.

9. The invention according to claim 8 wherein said fluid venting means comprises a vent passageway fluidly connecting said cylinder to said other of said passages of said tube, and valve means for allowing fluid to bleed out of said other of said passages only when said piston is in its extended position.

10. The invention according to claim 9 wherein said valve means comprises a valve stem reciprocally movable into and out of said other of said passages, said valve stem having one end secured to said piston for movement therewith and a valve passageway on the other end adapted to vent said other of said passages only when said piston is in its extended position and to seal said other of said passages in all other positions of said piston.

\* \* \* \* \*